United States Patent
Beaudin et al.

(10) Patent No.: US 8,688,172 B2
(45) Date of Patent: *Apr. 1, 2014

(54) FEEDER CABLE REDUCTION

(71) Applicant: Apple Inc., Cupertino, CA (US)

(72) Inventors: Steve Beaudin, Ottawa (CA); Keith Russell Edwards, Hutton (GB); Xiaoyun Hu, Ottawa (CA); Peter Deane, Fitzroy Harbor (CA)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/681,578

(22) Filed: Nov. 20, 2012

(65) Prior Publication Data

US 2013/0143623 A1 Jun. 6, 2013

Related U.S. Application Data

(63) Continuation of application No. 13/295,123, filed on Nov. 14, 2011, now Pat. No. 8,340,724, which is a continuation of application No. 12/768,515, filed on Apr. 27, 2010, now Pat. No. 8,060,147, which is a continuation of application No. 10/811,164, filed on Mar. 26, 2004, now Pat. No. 7,729,726.

(51) Int. Cl.
*H04B 1/06* (2006.01)
*H04B 7/00* (2006.01)
*H04M 1/00* (2006.01)
*H04B 1/38* (2006.01)

(52) U.S. Cl.
USPC .......................... 455/561; 455/279.1; 455/269

(58) Field of Classification Search
USPC ................. 455/279.1, 562.1, 575.7, 269, 561
See application file for complete search history.

(56) References Cited

U.S. PATENT DOCUMENTS

| | | | |
|---|---|---|---|
| 4,768,187 | A | 8/1988 | Marshall |
| 4,839,894 | A | 6/1989 | Rudish et al. |
| 5,216,434 | A | 6/1993 | Fukumura |

(Continued)

FOREIGN PATENT DOCUMENTS

| | | |
|---|---|---|
| EP | 1443594 A2 | 8/2004 |
| JP | 2002218080 | 8/2002 |

(Continued)

OTHER PUBLICATIONS

"Applications of PIN diodes," Agilent Technologies, May 25, 2004, 3 pages.

(Continued)

*Primary Examiner* — Andrew Wendell
(74) *Attorney, Agent, or Firm* — Meyertons, Hood, Kivlin, Kowert & Goetzel, P.C.

(57) ABSTRACT

The present disclosure allows transmission of multiple signals between masthead electronics and base housing electronics in a base station environment. At least some of the received signals from the multiple antennas are translated to being centered about different center frequencies, such that the translated signals may be combined into a composite signal including each of the received signals. The composite signal is then sent over a single feeder cable to base housing electronics, wherein the received signals are separated and processed by transceiver circuitry. Prior to being provided to the transceiver circuitry, those signals that were translated from being centered about one frequency to another may be retranslated to being centered about the original center frequency.

25 Claims, 5 Drawing Sheets

(56) References Cited

U.S. PATENT DOCUMENTS

| | | | |
|---|---|---|---|
| 5,289,505 | A | 2/1994 | LaRosa et al. |
| 5,748,669 | A | 5/1998 | Yada |
| 5,774,193 | A | 6/1998 | Vaughan |
| 5,784,683 | A | 7/1998 | Sistanizadeh et al. |
| 5,818,875 | A | 10/1998 | Suzuki et al. |
| 5,832,389 | A | 11/1998 | Dent |
| 5,883,901 | A | 3/1999 | Chiu et al. |
| 6,011,513 | A | 1/2000 | Wilson et al. |
| 6,088,381 | A | 7/2000 | Myers, Jr. |
| 6,125,109 | A | 9/2000 | Fuerter |
| 6,148,219 | A | 11/2000 | Engelbrecht et al. |
| 6,178,158 | B1 | 1/2001 | Suzuki et al. |
| 6,192,070 | B1 | 2/2001 | Poon et al. |
| 6,252,548 | B1 | 6/2001 | Jeon |
| 6,266,545 | B1 | 7/2001 | Backman et al. |
| 6,366,789 | B1 | 4/2002 | Hildebrand |
| 6,462,704 | B2 | 10/2002 | Rexberg et al. |
| 6,522,642 | B1 | 2/2003 | Scott |
| 6,535,732 | B1 | 3/2003 | McIntosh et al. |
| 6,594,508 | B1 | 7/2003 | Ketonen |
| 6,640,111 | B1 | 10/2003 | Shapira |
| 6,657,978 | B1 | 12/2003 | Millman |
| 6,760,342 | B1 | 7/2004 | Skones et al. |
| 6,801,788 | B1 | 10/2004 | Csapo et al. |
| 6,826,163 | B2 | 11/2004 | Mani et al. |
| 6,831,901 | B2 | 12/2004 | Millar |
| 6,963,305 | B2 | 11/2005 | Knapp |
| 6,983,174 | B2 | 1/2006 | Hoppenstein et al. |
| 7,038,621 | B2 | 5/2006 | Gabriel et al. |
| 7,069,051 | B1 | 6/2006 | Katz |
| 7,123,939 | B1 | 10/2006 | Bird et al. |
| 7,181,243 | B1 | 2/2007 | Nicholls et al. |
| 7,424,039 | B2 | 9/2008 | Deane et al. |
| 7,729,726 | B2 * | 6/2010 | Beaudin et al. ............. 455/561 |
| 8,060,147 | B2 * | 11/2011 | Beaudin et al. ............. 455/561 |
| 8,340,724 | B2 * | 12/2012 | Beaudin et al. ............. 455/561 |
| 2001/0044323 | A1 | 11/2001 | Waylett |
| 2002/0132644 | A1 | 9/2002 | Mellor et al. |
| 2002/0196497 | A1 | 12/2002 | LoCascio et al. |
| 2003/0071639 | A1 | 4/2003 | Haag et al. |
| 2003/0109283 | A1 | 6/2003 | Shapira et al. |
| 2003/0148747 | A1 | 8/2003 | Yamamoto |
| 2004/0190479 | A1 | 9/2004 | Deane et al. |
| 2004/0190480 | A1 | 9/2004 | Deane et al. |
| 2004/0266356 | A1 | 12/2004 | Javor et al. |
| 2005/0215288 | A1 | 9/2005 | Beaudin et al. |
| 2005/0250541 | A1 | 11/2005 | Bird et al. |
| 2006/0003808 | A1 | 1/2006 | Haskell et al. |
| 2006/0067262 | A1 | 3/2006 | Troemel, Jr. |
| 2006/0252461 | A1 | 11/2006 | Grant et al. |

FOREIGN PATENT DOCUMENTS

| | | | |
|---|---|---|---|
| WO | 9744908 | A1 | 11/1997 |
| WO | 9926317 | A1 | 5/1999 |
| WO | 0041339 | A1 | 7/2000 |
| WO | 2005088764 | A1 | 9/2005 |

OTHER PUBLICATIONS

European Search Report for European Patent Application No. 06795513.8 issued Dec. 30, 2011, 6 pages.

Jaffe et al., "Microwave Frequency Translator, IEEE Transactions on Microwave Theory and Techniques," Accessed May 25, 3004, 2 pages.

Final Office Action for U.S. Appl. No. 11/301,047 mailed Feb. 20, 2009, 10 pages.

Non-final Office Action for U.S. Appl. No. 11/301,047 mailed Sep. 4, 2008, 9 pages.

Notice of Allowance for U.S. Appl. No. 10/914,589 mailed Nov. 2, 2011, 4 pages.

Non-final Office Action for U.S. Appl. No. 10/914,589 mailed May 23, 2011, 13 pages.

Notice of Pre-Appeal Decision from the US Board of Patents and Interferences for U.S. Appl. No. 10/914,589 mailed Dec. 27, 2010, 2 pages.

Final Office Action for U.S. Appl. No. 10/914,589 mailed Jun. 30, 2010, 18 pages.

Non-final Office Action for U.S. Appl. No. 10/914,589 mailed Nov. 25, 2009, 14 pages.

Non-final Office Action for U.S. Appl. No. 10/914,589 mailed Feb. 17, 2009, 14 pages.

Non-final Office Action for U.S. Appl. No. 10/914,589 mailed Sep. 3, 2008, 13 pages.

Non-final Office Action for U.S. Appl. No. 10/914,589 mailed Mar. 7, 2008, 17 pages.

Notice of Allowance for U.S. Appl. No. 10/811,164 mailed Jan. 25, 2010, 8 pages.

Non-final Office Action for U.S. Appl. No. 10/811,164 mailed Jul. 6, 2009, 9 pages.

Final Office Action for U.S. Appl. No. 10/811,164 mailed Sep. 12, 2008, 15 pages.

Non-final Office Action for U.S. Appl. No. 10/811,164 mailed Mar. 6, 2008, 14 pages.

Non-final Office Action for U.S. Appl. No. 10/811,164 mailed Jul. 13, 2007, 15 pages.

Final Office Action for U.S. Appl. No. 10/811,164 mailed Mar. 30, 2007, 11 pages.

Non-final Office Action for U.S. Appl. No. 10/811,164 mailed Oct. 19, 2006, 12 pages.

Examiner's Answer to Appeal Brief for U.S. Appl. No. 11/301,047 mailed Dec. 24, 2009, 12 pages.

Notice of Allowance for U.S. Appl. No. 12/768,515 mailed Jul. 1, 2011, 9 pages.

Notice of Allowance for U.S. Appl. No. 12/768,515 mailed Mar. 17, 2011, 8 pages.

Non-final Office Action for U.S. Appl. No. 12/768,515 mailed Sep. 29, 2010, 11 pages.

Notice of Allowance for U.S. Appl. No. 10/910,840 mailed Nov. 21, 2006, 6 pages.

Notice of Allowance for U.S. Appl. No. 10/642,686 mailed Apr. 25, 2008, 7 pages.

Final Office Action for U.S. Appl. No. 10/642,686 mailed Oct. 31, 2007, 13 pages.

Non-final Office Action for U.S. Appl. No. 10/642,686 mailed May 15, 2007, 12 pages.

Pre-Brief Appeal Conference Decision for U.S. Appl. No. 11/301,047 mailed Jul. 1, 2009, 2 pages.

Examination Report in Indian Patent Application No. 5110/DELNP/2006, Apr. 1, 2013, 1 page.

* cited by examiner

FEEDER CABLE REDUCTION

CROSS-REFERENCE TO RELATED APPLICATION

This application is a continuation of U.S. patent application Ser. No. 13/295,123, filed on Nov. 14, 2011, entitled "Feeder Cable Reduction", which is a continuation of Ser. No. 12/768,515, filed on Apr. 27, 2010, (now U.S. Pat. No. 8,060,147, issued Nov. 15, 2011) entitled "Feeder Cable Reduction", which is a continuation of U.S. patent application Ser. No. 10/811,164, filed on Mar. 26, 2004 (now U.S. Pat. No. 7,729,726, issued on Jun. 1, 2010). Those prior patent applications are hereby incorporated by reference in their entireties as though fully and completely set forth herein.

FIELD OF THE INVENTION

The present invention relates to radio frequency communications, and in particular to translating signals received at one frequency from multiple antennas to being centered about different frequencies, and combining these signals for delivery over a common antenna feeder cable.

BACKGROUND OF THE INVENTION

In cellular communication environments, the electronics used to facilitate receiving and transmitting signals is distributed between a base housing and a masthead, which is mounted atop a building, tower, or like mast structure. The actual antennas used for transmitting and receiving signals are associated with the masthead. The masthead will generally include basic electronics to couple the antennas to corresponding antenna feeder cables, which connect to transceiver and amplifier electronics located in the base housing.

Historically, the amount of electronics placed in the masthead has been minimized, due to inhospitable environmental conditions, such as lightning, wind, precipitation, and temperature extremes, along with the difficulty in replacing the electronics when failures occur. Maintenance of the masthead is time-consuming and dangerous, given the location of the masthead. Minimizing the electronics in the masthead has resulted in essentially each antenna being associated with a separate antenna feeder cable.

As time progressed, the cost of the electronics has been greatly reduced, whereas the cost of the antenna feeder cables has held relatively constant, if not increased. Thus, a decade ago the antenna feeder cables were an insignificant cost associated with a base station environment, whereas today the cost of the antenna feeder cables is a significant portion of the cost associated with the base station environment. Accordingly, there is a need to minimize the number of antenna feeder cables associated with a base station environment, without impacting the functionality or operability of the base station environment. Further, there is a need to minimize the increase in cost associated with the masthead and base housing electronics due to minimizing the number of antenna feeder cables required to connect the masthead electronics to the base housing electronics.

SUMMARY OF THE INVENTION

The present invention allows transmission of multiple signals between masthead electronics and base housing electronics in a base station environment. At least some of the received signals from the multiple antennas are translated to being centered about different center frequencies, such that the translated signals may be combined into a composite signal including each of the received signals. The composite signal is then sent over a single feeder cable to base housing electronics, wherein the received signals are separated and processed by transceiver circuitry. Prior to being provided to the transceiver circuitry, those signals that were translated from being centered about one frequency to another may be retranslated to being centered about the original center frequency. In one embodiment, the multiple antennas represent main and diversity antennas. In such an embodiment, the received signals from the diversity antenna(s) may be translated and combined with the signal received from the main antenna. The receive signal from the main antenna may or may not be translated prior to combining with the translated signals from the diversity antenna(s). The present invention is applicable in single mode and multi-mode environments. It is also applicable to systems which use four branch receive diversity. Future systems such as MIMO which may use two transmit signals and four receive signals per sector will also greatly benefit from this invention. In essence this invention can be leveraged in any deployment scenario where there are more receive signals than transmit signals.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention facilitates the reduction of cabling required in a base station environment. In general, signals that were normally transmitted over separate cables are frequency shifted about different center frequencies, combined, and sent over a single cable. At a receiving end of the cable, the combined signals are recovered and processed in traditional fashion. The invention is particularly useful in a diversity environment, wherein multiple antennas are used to receive a common signal. In such an environment, certain of the signals received from the main and diversity antennas are shifted in frequency, combined with one another, and transmitted over a common cable. Accordingly, each sector, which includes a main and one or more diversity antennas, will need only one cable for transmitting the received signals from the antennas to electronics in a base housing.

Figure 1:
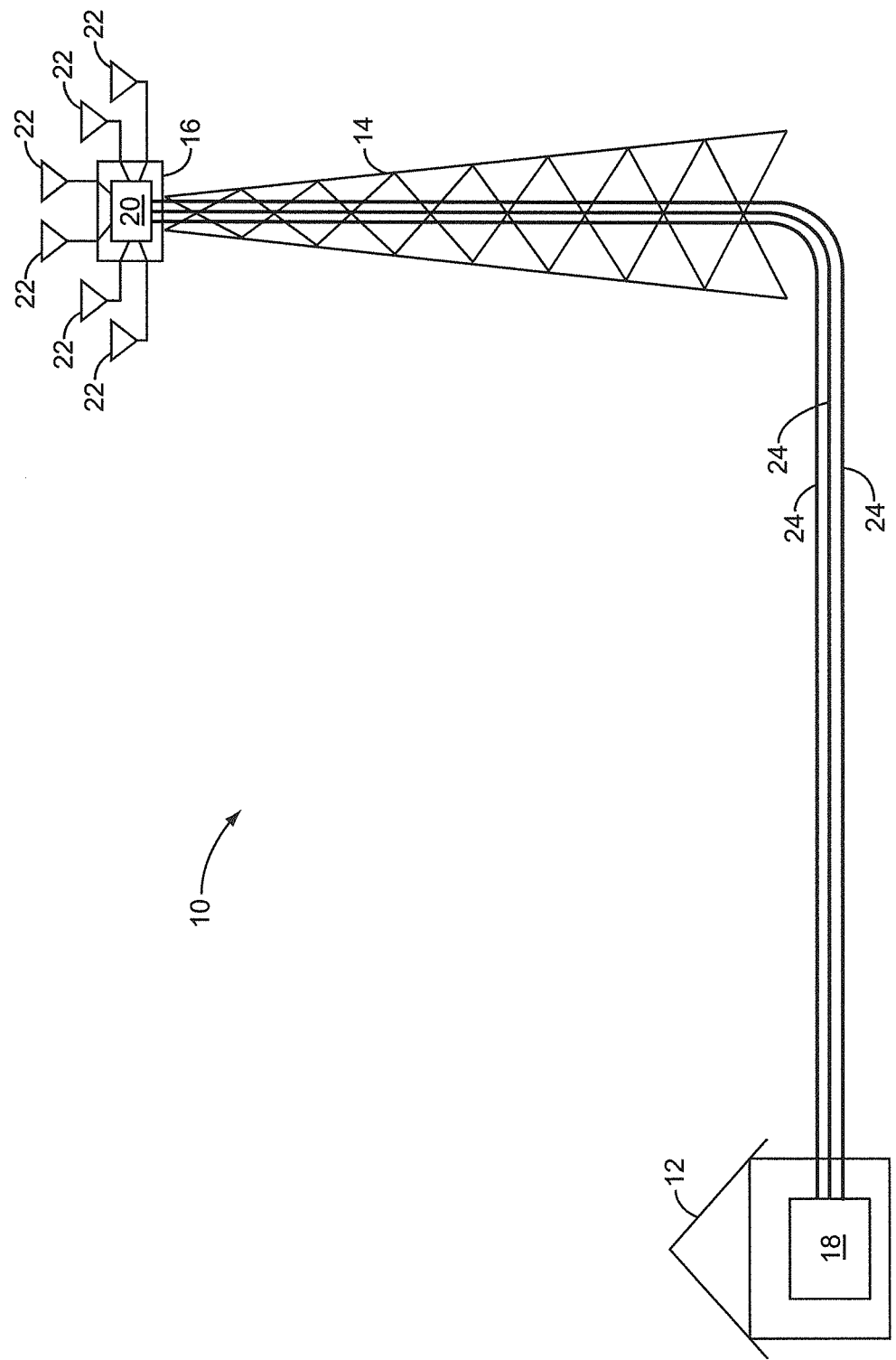
FIG. 1 is a block representation of a base station environment according to one embodiment of the present invention.

Prior to delving into the details of the present invention, an overview of a base station environment 10 is illustrated in FIG. 1 according to one embodiment of the present invention. The illustrated base station environment 10 is exemplary of the primary components in a cellular access network. A base housing 12 is provided in a secure location in association with a mast 14, which may be a tower or other structure near the top of which is mounted a masthead 16. Communications for the base station environment 10 are distributed between the masthead 16 and the base housing 12. In particular, the base housing 12 will include base housing electronics 18, which include the primary transceiver and power amplification circuitry required for cellular communications. The masthead 16 will include masthead electronics 20, which generally comprise the limited amount of electronics necessary to operatively connect with multiple antennas 22, which are mounted on the masthead 16. The masthead electronics 20 and the base housing electronics 18 are coupled together with one or more feeder cables 24. For the illustrated embodiment, there are six antennas 22 divided into three sectors having two antennas 22 each. For each sector, one feeder cable 24 is provided between the masthead electronics 20 and the base housing electronics 18. Accordingly, there are three feeder cables 24 illustrated in FIG. 1. In traditional base station environments 10, each antenna would be associated with one feeder cable 24.

Figure 2:
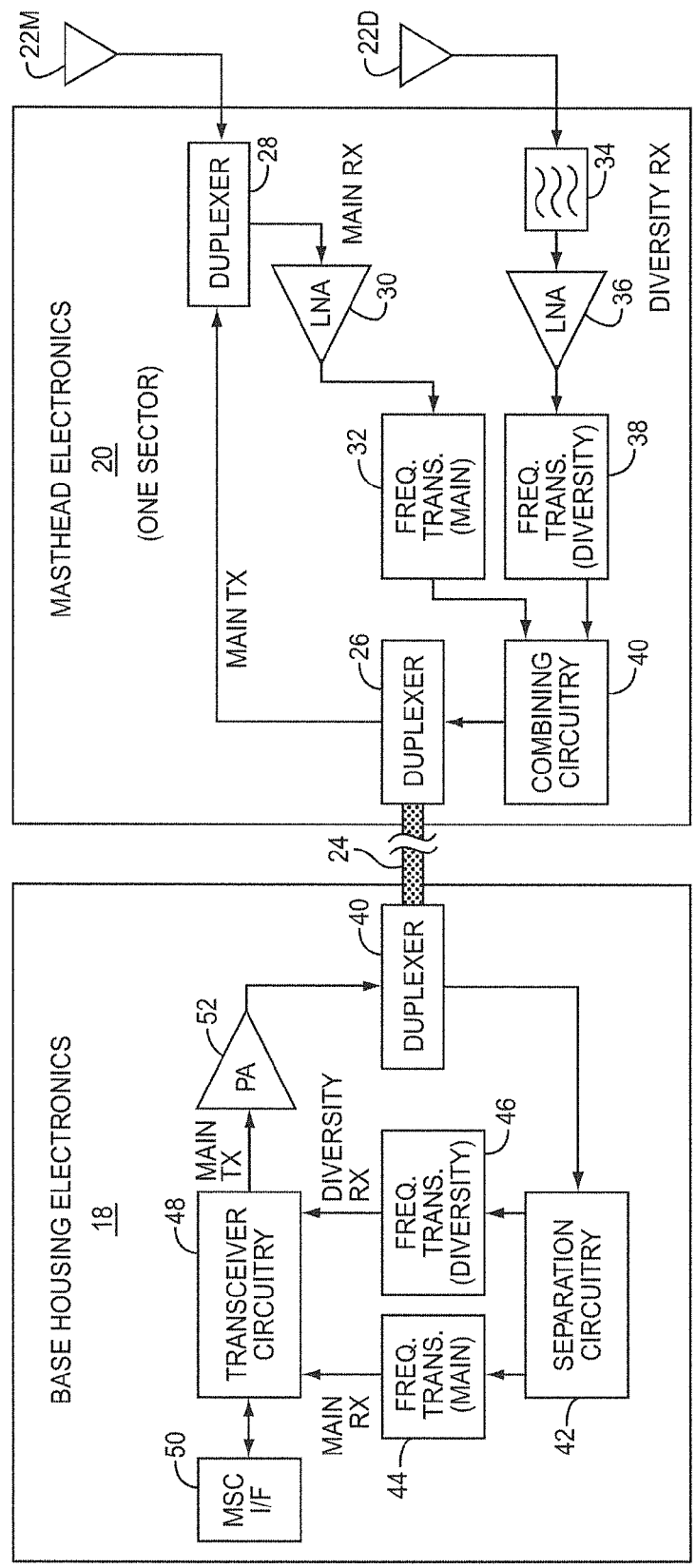
FIG. 2 is a block representation of base housing electronics and masthead electronics according to a first embodiment of the present invention.

Turning now to FIG. 2, a block representation of the base housing electronics 18 and one sector of the masthead electronics 20 is provided according to one embodiment of the present invention. Notably, there are two antennas 22 illustrated. A first antenna is referred to as a main antenna 22M, and the second antennas is referred to as a diversity antenna 22D. For signals transmitted from the main antenna 22M, a signal to be transmitted will be provided over the feeder cable 24 to a duplexer 26 in the masthead electronics 20. The signal to be transmitted (MAIN TX) is sent to another duplexer 28 and transmitted via the main antenna 22M.

For receiving, signals transmitted from remote devices will be received at both the main antenna 22M and the diversity antenna 22D. The signals received at the main antenna 22M are referred to as the main receive signals (MAIN RX), and the signals received at the diversity antenna 22D are referred to as the diversity receive signals (DIVERSITY RX). In operation, the main receive signal received at the main antenna 22M is routed by the duplexer 28 to a low noise amplifier (LNA) 30, which will amplify the main receive signal and present it to main frequency translation circuitry 32. The main frequency translation circuitry 32 will effect a frequency translation, which is essentially a shift of the main receive signal from being centered about a first center frequency to being centered around a second center frequency. The main frequency translation circuitry 32 may take the form of a mixer, serrodyne, or the like, which is capable of shifting the center frequency of the main receive signal.

Similarly, the diversity receive signal received at the diversity antenna 22D may be filtered via a filter 34 and amplified using an LNA 36 before being presented to diversity frequency translation circuitry 38. The diversity frequency translation circuitry 38 will effect a frequency translation of the diversity receive signal from being centered about the first center frequency to being centered about a third center frequency. Preferably, the first, second, and third center frequencies are sufficiently different as to allow signals being transmitted or received at those frequencies to be combined without interfering with one another.

Figure 3:
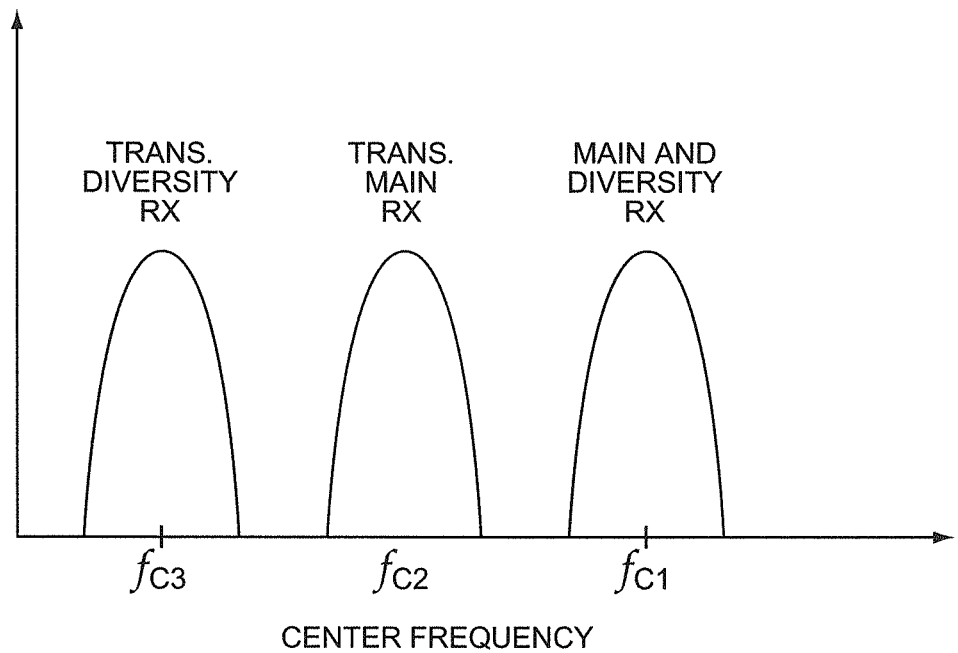
FIG. 3 is a graphical illustration of a frequency translation process according to the embodiment of FIG. 2.

With reference to FIG. 3, a graphical illustration of the frequency translation process is provided. As illustrated, the main and diversity receive signals are centered about the first center frequency $f_{C1}$, wherein the translated main receive signal is centered about center frequency $f_{C2}$ and the translated diversity receive signal is centered about center frequency $f_{C3}$. The center frequencies are sufficiently spaced along the frequency continuum to avoid any interference between the signals transmitted on those center frequencies.

Returning to FIG. 2, the translated main receive signal and the translated diversity receive signal provided by the main and diversity frequency translation circuitries 32 and 38 are then combined with combining circuitry 40 and presented to the duplexer 26. The duplexer 26 will then transmit the composite signal to the base housing electronics 18.

The composite signal will be received by a duplexer 40 and provided to separation circuitry 42, which will effectively separate the translated main receive signal and the translated diversity receive signal and provide them to main frequency translation circuitry 44 and diversity frequency translation circuitry 46, respectively. The translated main and diversity receive signals will be shifted back to being centered about the first center frequency $f_{C1}$, which was originally used for transmitting the main and diversity receive signals from the remote device. Accordingly, the main and diversity receive signals are recovered by the main and diversity frequency translation circuitries 44 and 46 and provided to transceiver circuitry 48, wherein the receive signals are processed in traditional fashion and forwarded to a mobile switching center (MSC) or other device via an MSC interface 50.

For transmitted signals, the base housing electronics 18 will generate a main transmit signal (MAIN TX) using the transceiver circuitry 48 and provide the main transmit signal to a power amplifier (PA) 52. The amplified main transmit signal will then be transmitted to the duplexer 40, which will send the amplifier main transmit signal over the feeder cable 24 toward the masthead electronics 20, which will route the main transmit signal to the main antenna 22M as described above.

The previous embodiment is configured to minimize the impact on the existing transceiver circuitry 48 in the base housing electronics 18. In an alternative embodiment, the translated main and diversity receive signals may be presented directly to the transceiver circuitry 48, which may be modified to be able to process the signals directly, instead of requiring them to be translated back to being centered about their original center frequency, $f_{C1}$. Further, the receive signals that are translated may be shifted up or down in frequency to varying degrees. For example, the receive signals may be shifted down to an intermediate frequency, to a very low intermediate frequency, or to a near DC frequency, such as that used in Zero IF architectures.

Although not shown, power may be fed from the base housing electronics 18 to the masthead Electronics 20 via the antenna feeder. Power would be coupled to the feeder cable 24 and off of the feeder cable 24 using a conventional Bias-T as is typically done for masthead electronics 20. Furthermore, a communication link between the base housing electronics 18 and masthead electronics 20 may also be desirable and implemented. The communication link could be implemented at baseband or at an RF frequency other than those frequencies of interest to the wireless operator, using a low power RF transceiver.

Furthermore, if it is desirable to control the frequency translation to a high level of precision, a local oscillator (LO) signal in the form of a sine wave could be fed up the feeder cable 24 from the base housing electronics 18 and be extracted by the masthead electronics 20. The LO signal could be a sine wave in the range of 100 to 200 MHz to facilitate separation from the RX and TX signals.

Redundancy is often an issue for the masthead electronics 20. It is therefore desirable that a minimum amount of functionality be maintained in the event of a hardware failure with either the LNAs or frequency translation circuitry. It would therefore be advantageous in both the main and diversity receive paths be equipped with frequency translation circuitry. If one frequency translation circuit 32 should fail, the main signal would pass through the redundant circuitry unshifted and remain at its original frequency. In such an event the main receive signal could propagate downwards to the base housing electronics 18 at its original RF frequency and the diversity receive signal would continue to be propagated as described.

Figure 4:
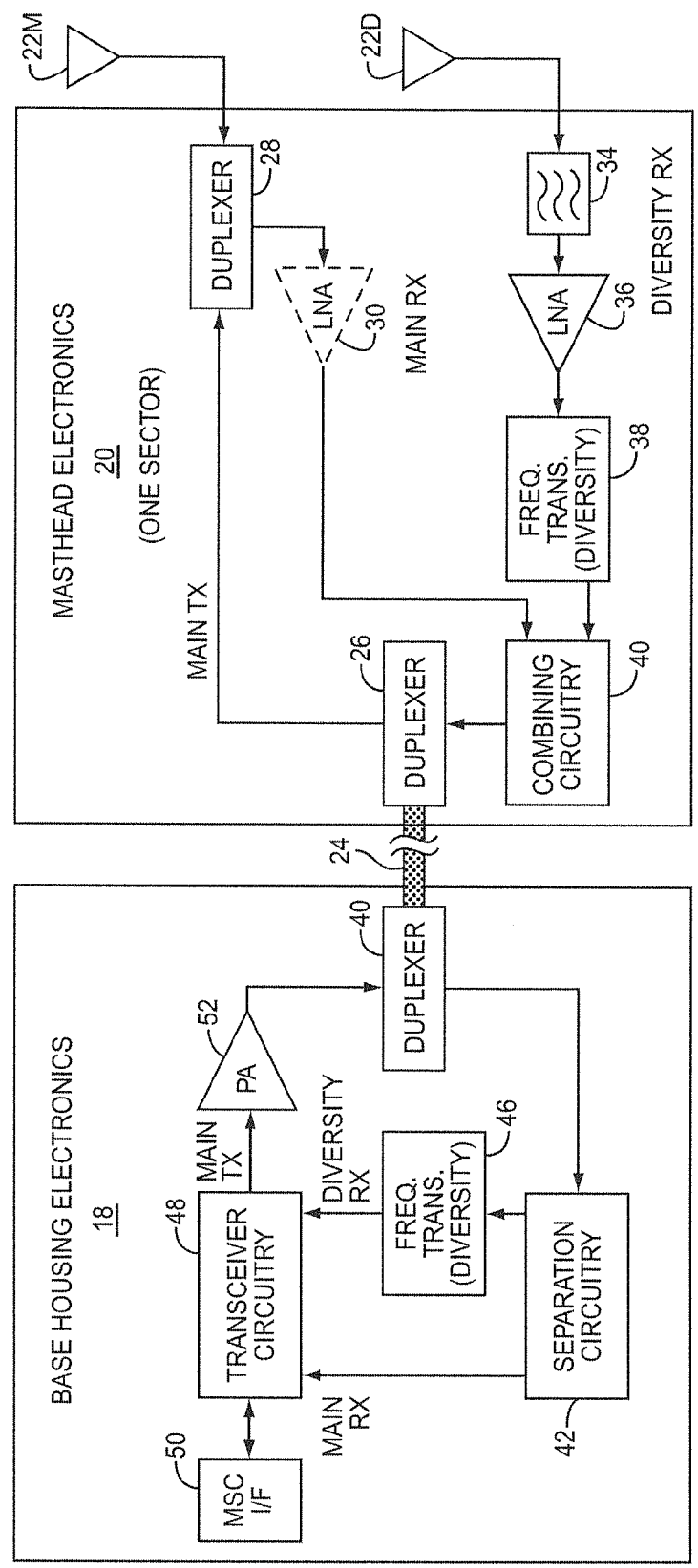
FIG. 4 is a block representation of base housing electronics and masthead electronics according to a second embodiment of the present invention.

Turning now to FIG. 4, a second embodiment of the present invention is illustrated. In this embodiment, the main receive signal is not translated, while the diversity receive signal is translated. Thus, the main receive signal and a translated diversity receive signal are combined in the masthead electronics 20 and sent over the feeder cable 24 to the base housing electronics 18. In particular, the main receive signal is received at main antenna 22M, and forwarded to combining circuitry 40 via the duplexer 28, and through an LNA 30. The diversity receive signal is received at diversity antenna 22D, filtered by the filter 34, amplified by the LNA 36, and translated from the first center frequency $f_{C1}$ to a second center frequency $f_{C2}$ by the diversity frequency translation circuitry 38. The main receive signal and the translated diversity receive signal are combined by combining circuitry 40 and sent to duplexer 26 for delivery to the base housing electronics 18 over the feeder cable 24. Upon receipt, the duplexer 40 at the base housing electronics 18 will send a composite receive signal to the separation circuitry 42, which will provide the main receive signal to the transceiver circuitry 48, and the translated diversity receive signal to the diversity frequency translation circuitry 46, which will translate the translated diversity receive signal back to being centered about center frequency $f_{C1}$ to effectively recover the diversity receive signal, which is then provided to the transceiver circuitry 48 for processing. The main transmit signal is transmitted from the main antenna 22M as described in association with FIG. 2.

Figure 5:
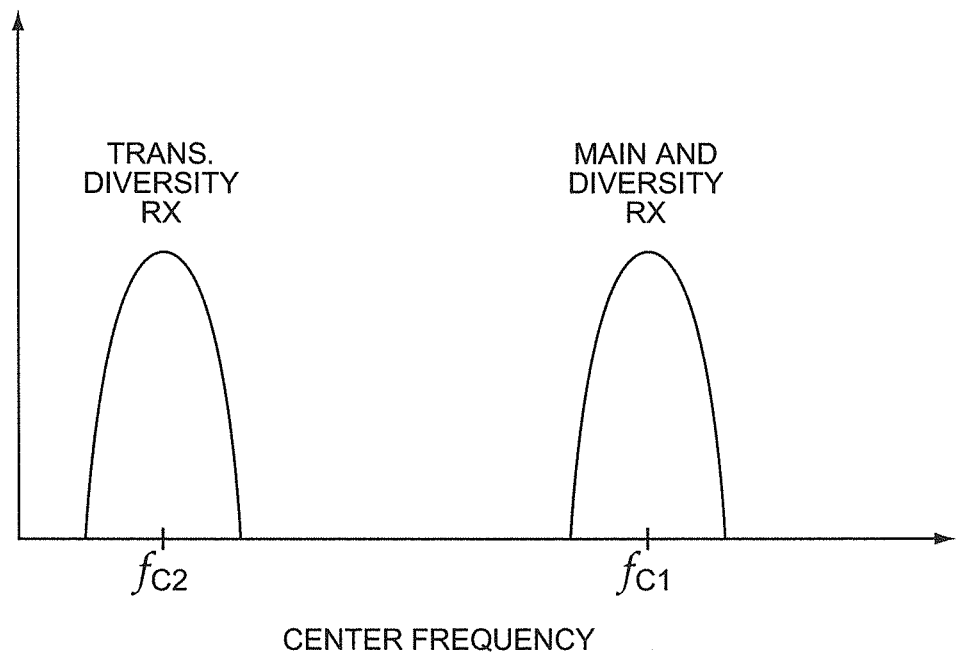
FIG. 5 is a graphical illustration of a frequency translation process according to the embodiment of FIG. 4.

With reference to FIG. 5, a graphical illustration of the translation of the diversity receive signal is shown, as processed in the embodiment of FIG. 4. As illustrated, the translated diversity receive signal is shifted to be centered about center frequency $f_{C2}$, wherein both the main and the original diversity receive signals are centered about center frequency $f_{C1}$.

If a masthead LNA is not desired or needed for the main receive signal, the invention can be further simplified by removing the LNA 30 and Duplexer 28 and combining circuitry 40. In such a case, both the transmit and main receive signals can be fed directly to the duplexer 26, where they will be combined with a translated diversity receive signal. The duplexer 26 would be designed such that the main filter encompass both the main transmit and main receive frequencies, and the other filter would encompass a shifted diversity receive frequency. This implementation would provide a simpler and less costly module while minimizing transmit path loss.

The advantages of this embodiment are twofold. Firstly, the main receive path can be composed of only passive components, thereby improving reliability. Alternatively, if an LNA 30 is desired at the masthead 16 for both the main and diversity receive signals, this embodiment remains simpler since only the diversity receive frequency needs to be translated at the mast, simplifying the electronics and frequency plan.

Figure 6:
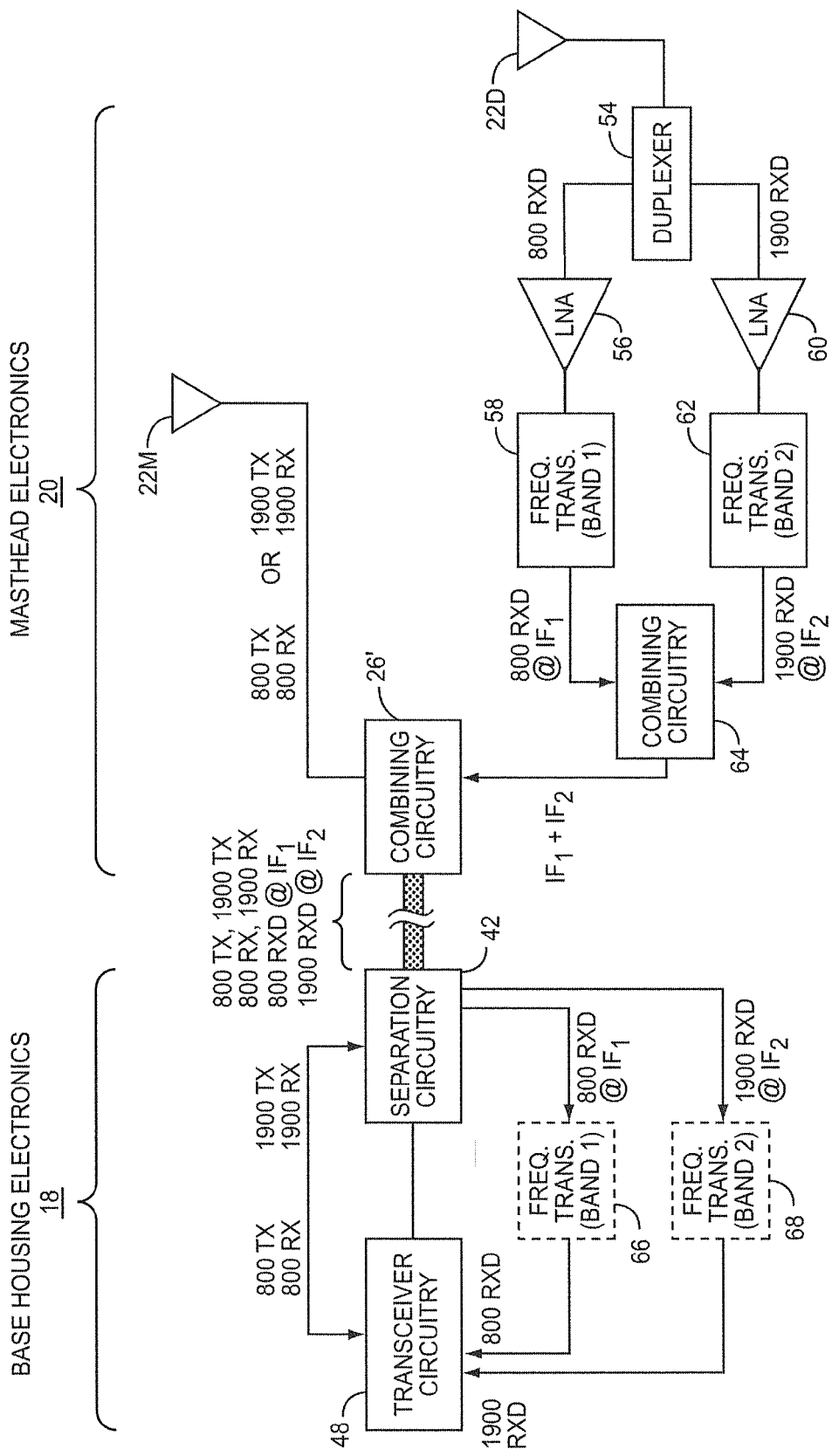
FIG. 6 is a block representation of base housing electronics and masthead electronics according to a third embodiment of the present invention.

Turning now to FIG. 6, a multi-band implementation of the present invention is illustrated. A multi-band communication environment is one in which the same or different cellular communication techniques are supported by a base station environment 10. As illustrated, a single base housing 12 is used, but different base housings 12 may be used for the different frequency bands. In many instances, the different modes of communication, whether incorporating the same or different underlying communication technologies, are centered about different center frequencies. Two common frequencies about which cellular communications are centered are 800 MHz and 1900 MHz. Accordingly, the base station environment 10 must be able to transmit and receive signals at both 800 MHz and 1900 MHz, and may require diversity antennas 22D to assist in receiving signals. In operation, received signals in the 800 or 1900 MHz bands (BAND 1 and BAND 2, respectively) may be received at diversity antenna 22D, wherein a duplexer 54 will send 800 MHz receive signals (800 RXD) through LNA 56 to BAND 1 frequency translation circuitry 58, which will translate the 800 MHz receive signal about a different center frequency. In this example, assume the BAND 1 frequency translation circuitry downconverts the 800 MHz receive signal to a first intermediate frequency ($IF_1$), wherein the downconverted signal is generally referred to as 800 RXD @ $IF_1$. Similarly, 1900 MHz receive signals (1900 RXD) will be provided through LNA 60 to BAND 2 frequency translation circuitry 62, which will downconvert the 1900 MHz receive signal to a second intermediate frequency ($IF_2$), wherein the downconverted signal is represented as 1900 RXD @ $IF_2$.

The 800 RXD @ $IF_1$ and 1900 RXD @ $IF_2$ signals are combined using combining circuitry 64 to form a composite signal $IF_1+IF_2$, which is provided to combining circuitry 26', which will combine the composite signal $IF_1+IF_2$ with any signals received at the main antenna 22M, and in particular, 800 MHz and 1900 MHz receive signals (800 RX and 1900 RX). Thus, the combining circuitry 26' may combine the 800 and 1900 MHz receive signals with the composite $IF_1+IF_2$ signal and present them over the feeder cable 24 to separation circuitry 42 provided in the base housing electronics 18. The separation circuitry 42 will provide the 800 and 1900 MHz signals to the transceiver circuitry 48, as well as send the 800 RXD @ $IF_1$ and 1900 RXD @ $IF_2$ (translated) signals to respective BAND 1 and BAND 2 frequency translation circuitry 66 and 68. The BAND 1 frequency translation circuitry 66 may upconvert the 800 RXD @ $IF_1$ signal to recover the original 800 RXD signal, and the BAND 2 frequency translation circuitry 68 will process the 1900 RXD @ $IF_2$ signal to recover the original 1900 RXD signal. The 800 RXD and 1900 RXD signals are then provided to the transceiver circuitry 48 for processing in traditional fashion. As noted for the previous embodiment, the transceiver circuitry 48 may be modified to process the downconverted or otherwise translated signals without requiring retranslations back to the original center frequencies, as provided by the BAND 1 and BAND 2 frequency translation circuitry 66 and 68.

Accordingly, the present invention provides for translating signals from one or more antennas 22 in a base station environment 10 in a manner allowing the translated signals to be combined with one another and other untranslated signals for transmission over a common antenna feeder 24. The present invention is applicable to single and multi-band communication environments, and is not limited to communication technologies or particular operating frequencies. In general, the translation of received signals need only operate such that when the signals are combined with other signals, there is no interference or the interference is otherwise minimal or manageable. Further, the receive signals may be from any spatially diverse array of antennas for one or more sectors.

As noted, two base housings 12 that operate in different bands may share the same feeder cables 24 and masthead 16.

Redundancy is a key issue for masthead electronics 20. Active components which are used in the LNA 30 and frequency translation circuitry 32, 38 are less reliable than passive components used to implement the duplexers 26, combining circuitry 40, and filters 34. As such, it may be necessary to bypass the LNAs 30 within the module. An LNA bypass is standard practice for masthead LNAs 30.

More important is redundancy in the frequency translation circuitry 32, 38. Since the objective is to transmit two receive signals, main and diversity, down the same antenna feeder 24 to the base housing electronics 18, loss of the frequency translation function means that only one of the receive signals can be relayed to the base housing electronics 18. It is therefore important to consider redundancy schemes in practice.

One approach is to simply include multiple levels of redundancy within each circuit block. A more sophisticated scheme would be to further use frequency translation circuitry on both the main receive and diversity receive signals as shown in FIG. 2. However, the frequency translation circuitry 32, 38 should be designed as to allow a signal to pass through with relatively little attenuation in the event of a hardware failure. Such would be the case with a serrodyne implemented using exclusively shunt or reflection type switches. The combining circuitry 40 could be designed to accept a signal at the translated receive frequency or original receive frequency on either port. The frequency translation circuitry 32, 38 would only be used in one branch at any given time, and in the other branch the signal would be passed through the frequency translation circuitry with little or no effect. In the event that the active frequency translation circuitry 32, 38 should fail, the unused frequency translation circuitry 32, 38 could be turned on to implement the frequency translation on this branch, and the failed frequency translation circuitry 32, 38 would then allow the signal to pass through untranslated.

Finally, in cases where four-branch receive diversity is used, it is conceivable that each sector contain one transmit signal and four receive signals. In such a case the present invention could easily be expanded to translate the frequency of all receive signals or alternately on the three diversity receive signals to separate frequencies and combine them all onto one feeder cable 24 where they would be separated by another circuit at the base station housing 12.

Those skilled in the art will recognize improvements and modifications to the preferred embodiments of the present invention. All such improvements and modifications are considered within the scope of the concepts disclosed herein and the claims that follow.

The invention claimed is:

1. An apparatus comprising:
a first electronics unit having an input configured to receive a composite signal transmitted from a second electronics unit, the composite signal comprising a first signal centered around a first frequency and a second signal centered around a second frequency, wherein the second electronics unit is configured to form the composite signal by:
translating the first signal to be centered around the first frequency, the first signal being received by the second electronics unit as being centered around the first frequency and through a first antenna; and
combining the translated first signal with the second signal, the second signal being received by the second electronics unit from a second antenna and centered around the second frequency;
wherein the first electronics unit is configured to retranslate the first signal to be centered around the second frequency subsequent to receiving the composite signal.

2. The apparatus as recited in claim 1, wherein the first electronics unit is located in a base station and is configured to received the composite signal through a cable coupled to the second electronics.

3. The apparatus as recited in claim 2, wherein the second electronics unit is located on an antenna mast that includes the first and second antennas.

4. The apparatus as recited in claim 3, wherein the first antenna is a diversity antenna and wherein the second antenna is a main antenna.

5. The apparatus as recited in claim 1, wherein the first electronics unit includes a separation unit coupled to receive the composite signal and configured to separate the first and second signals from the composite signal.

6. A method comprising:
receiving, at a first electronics unit, a composite signal transmitted from a second electronics unit, wherein the composite signal comprises a first signal centered around a first frequency and a second signal centered around a second frequency, and wherein the second electronics unit forms the composite signal by:
translating the first signal to be centered around the first frequency, the first signal being received by the second electronics unit through a first antenna and being centered around the first frequency; and
combining the translated first signal with the second signal, the second signal being received by the second electronics unit from a second antenna and centered around the second frequency; and
re-translating, at the first electronics unit, the first signal to be centered around the second frequency.

7. The method as recited in claim 6, further comprising the first electronics unit receiving the composite signal via a cable coupled between the first electronics unit and the second electronics unit.

8. The method as recited in claim 6, further comprising a separation unit in the first electronics unit separating the first and second signals from the composite signal, wherein said re-translating is performed subsequent to said separating.

9. The method as recited in claim 8 further comprising forwarding the first and second signals to transceiver circuitry subsequent to said re-translating.

10. The method as recited in claim 9 further comprising:
transmitting the first and second signals from the transceiver circuitry to a mobile switching center interface; and transmitting the first and second signals from the mobile switching center interface to a mobile switching center.

11. An apparatus comprising:
a base electronics unit configured to receive a composite signal from a masthead electronics unit, wherein the composite signal comprises a first signal having a first center frequency and a second signal having a second frequency, and wherein the base electronics unit is configured to translate the first signal to the second center frequency;
wherein the composite signal is formed by the masthead electronics unit combining the first signal with the second signal, wherein the first signal is received by the masthead electronics unit from a diversity antenna and having the second center frequency and wherein the second signal is received by the masthead electronics unit from a main antenna and having the second center frequency, wherein the masthead electronics unit is configured to translate the first signal to the first center frequency prior to combining with the second signal.

12. The apparatus as recited in claim 11, wherein the base electronics unit includes separation circuitry configured to separate the first signal from the composite signal and further configured to separate the second signal from the composite signal.

13. The apparatus as recited in claim 12, wherein the base electronics unit further includes translation circuitry coupled to receive the first signal from the separation circuitry and configured to translate the first signal from the first frequency to the second frequency.

14. The apparatus as recited in claim 13, wherein the base electronics unit further includes transceiver circuitry coupled to receive the first signal from the translation circuitry and further configured to receive the second signal, wherein the transceiver circuitry is configured to transmit the first and second signals to a mobile switching center interface.

15. The apparatus as recited in claim 11, further comprising a cable coupled to the base electronics unit, wherein the base electronics unit is configured to receive the composite signal from the masthead electronics unit via the cable.

16. An apparatus comprising:
a masthead electronics unit configured to transmit a composite signal including first and second signals centered at first and second frequencies, respectively, wherein the masthead electronics unit is further configured to:
receive the first signal from a first antenna, wherein the first signal is centered at the second frequency when received from the first antenna;
receive the second signal from a second antenna, wherein the second signal is centered at the second frequency when received from the second antenna;
translate the first signal to be centered around the first frequency; and
combine, after translating, the first signal with the second signal to form a composite signal;
wherein the masthead electronics unit is configured to transmit the composite signal to a base electronics unit configured to retranslate the first signal to be centered at the second frequency.

17. The apparatus as recited in claim 16, wherein the masthead electronics unit is configured to transmit the composite signal via a cable coupled between the masthead electronics unit and the base electronics unit.

18. The apparatus as recited in claim 16, wherein the first antenna is a diversity antenna and the second antenna is a main antenna.

19. The apparatus as recited in claim 16, wherein the masthead electronics unit includes:
a filter coupled to receive the first signal from the first antenna and configured to filter the first signal;
a low noise amplifier coupled to receive the first signal from the filter, wherein the low noise amplifier is configured to amplify the first signal;
a translation unit coupled to receive the first signal from the low noise amplifier and configured to translate the first signal to be centered at the first frequency; and
a combining circuit configured to combine the first and second signals to form the composite signal.

20. The apparatus as recited in claim 16, wherein the masthead electronics unit is coupled to receive a transmit signal from the base electronics unit and is further coupled to convey the transmit signal to the second antenna for transmission.

21. An apparatus comprising:
an antenna assembly including a base electronics unit and a masthead electronics unit, wherein the base electronics unit is configured to:
receive a composite signal from a masthead electronics unit, wherein the composite signal comprises a first signal having a first center frequency and a second signal having a second frequency, and wherein the base electronics unit is configured to translate the first signal to the second center frequency; and
wherein the masthead electronics unit is configured to:
receive the first signal from a first antenna, wherein the first signal is centered at the second frequency when received from the first antenna;
receive the second signal from a second antenna, wherein the second signal is centered at the second frequency when received from the second antenna;
translate the first signal to be centered around the first frequency; and
combine, after translating, the first signal with the second signal to form a composite signal.

22. The apparatus as recited in claim 21, wherein the base electronics unit and the masthead electronics unit are coupled together by a cable, wherein the masthead electronics unit is configured to convey the composite signal to the base electronics unit via the cable.

23. The apparatus as recited in claim 22, wherein the base electronics unit is configured to convey a transmit signal to the masthead electronics unit via the cable, wherein the masthead electronics unit is configured to convey the transmit signal to the second antenna for transmission.

24. The apparatus as recited in claim 21, wherein the masthead electronics unit includes:
a first translation circuit coupled to receive the first signal and configured to translate the first signal to being centered at the first frequency; and
a combining circuit coupled to receive the first signal from the translation circuit and further coupled to receive the second signal, wherein the combining circuit is configured to form the composite signal by combining the first and second signals.

25. The apparatus as recited in claim 24, wherein the base electronics unit includes:
a separation circuit coupled to receive the composite signal, wherein the separation circuit is configured to separate the first and second signals from the composite signal; and
a second translation circuit coupled to receive the first signal from the separation circuit and configured to retranslate the first signal to being centered at the second frequency.

* * * * *